(12) United States Patent
Turhan et al.

(10) Patent No.: US 12,709,337 B2
(45) Date of Patent: Aug. 18, 2026

(54) ACTIVE DOWNFORCE REACTIVE CONTROL BASED ON ADAPTIVE AERODYNAMIC BIAS BOUNDS

(71) Applicant: GM GLOBAL TECHNOLOGY OPERATIONS LLC, Detroit, MI (US)

(72) Inventors: Mustafa Hakan Turhan, Kitchener (CA); Mohammad Pournazeri, Etobicoke (CA); Jason D. Fahland, Fenton, MI (US); Saurabh Kapoor, Windsor (CA); Naser Mehrabi, Richmond Hill (CA); Seyedalireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 238 days.

(21) Appl. No.: 18/782,212

(22) Filed: Jul. 24, 2024

(65) Prior Publication Data

US 2026/0028069 A1 Jan. 29, 2026

(51) Int. Cl.
*B62D 37/02* (2006.01)

(52) U.S. Cl.
CPC .................................. *B62D 37/02* (2013.01)

(58) Field of Classification Search
CPC ..................................................... B62D 37/02
See application file for complete search history.

(56) References Cited

U.S. PATENT DOCUMENTS

2013/0226414 A1* 8/2013 De Luca ................ B62D 37/02 701/49
2017/0088200 A1* 3/2017 Heil ....................... B62D 37/02
2017/0349167 A1* 12/2017 Fahland ................ B60W 10/22

OTHER PUBLICATIONS

Mashrouteh S. et al., Multi-Actuation Controller for Performance Vehicles: Optimal Torque Allocation and Active Aerodynamic, Mar. 3, 2022, IEEE Transactions on Vehicular Technology, vol. 71, No. 3, pp. 2721-2732 (Year: 2022).*
U.S. Appl. No. 18/173,925, filed Feb. 24, 2023, Pournazeri et al.
U.S. Appl. No. 18/350,491, filed Jul. 11, 2023, Pournazeri et al.
U.S. Appl. No. 18/350,508, filed Jul. 11, 2023, Pournazeri et al.
U.S. Appl. No. 18/350,503, filed Jul. 11, 2023, Pournazeri et al.
U.S. Appl. No. 18/645,641, filed Apr. 25, 2024, Hajiloo et al.

* cited by examiner

*Primary Examiner* — Navid Z. Mehdizadeh
*Assistant Examiner* — Caitlin R Mccleary

(57) ABSTRACT

A downforce control system of a host vehicle includes: at least one module configured to generate a first bias lower bound and a first bias upper bound; a parameter module configured to determine a current understeering angle of the host vehicle; an adaptive bias bounding module configured to generate an understeer and oversteer multiplier based on the current understeering angle; a fusion module configured, based on the first bias lower bound, the first bias upper bound, and the understeer and oversteer multiplier, to generate a second bias lower bound and a second bias upper bound; and a downforce tracking module configured, based on the second bias lower bound and the second bias upper bound, to adjust position of one or more downforce devices of the host vehicle.

20 Claims, 9 Drawing Sheets

334
304
704
714
700
712
706
708
710

ACTIVE DOWNFORCE REACTIVE CONTROL BASED ON ADAPTIVE AERODYNAMIC BIAS BOUNDS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to chassis control systems, and more particularly to downforce control systems.

Chassis control systems can include traction control systems (TCSs), electronic stability control (ESC) systems, all-wheel drive (AWD) systems, and a downforce control system. TCS systems detect wheel (or tire) slip and apply brakes at one or more wheels and/or reduce torque supplied to the one or more wheels. ESC systems detect loss of steering control and apply brakes to improve vehicle stability. An AWD system provides power to all wheels concurrently or as demanded. A downforce control system controls downforce on a vehicle. Downforce refers to a vertical load created by aerodynamic components of a host vehicle during motion of the host vehicle. For example, a host vehicle may include a rear spoiler (or rear "fin") and a front gurney. Actuators may be used to adjust positions of the rear spoiler and the front gurney to adjust downforce on the host vehicle.

SUMMARY

A downforce control system of a host vehicle is disclosed. The downforce control system includes: at least one module configured to generate a first bias lower bound and a first bias upper bound; a parameter module configured to determine a current understeering angle of the host vehicle; an adaptive bias bounding module configured to generate an understeer and oversteer multiplier (e.g., a learning-based multiplier) based on the current understeering angle; a fusion module configured, based on the first bias lower bound, the first bias upper bound, and the understeer and oversteer multiplier, to generate a second bias lower bound and a second bias upper bound; and a downforce tracking module configured, based on the second bias lower bound and the second bias upper bound, to adjust position of one or more downforce devices of the host vehicle.

In other features, the second bias lower bound is less than or equal to an aerodynamic bias value, which is less than or equal to the second bias upper bound. The aerodynamic bias value is equal to a front downforce of the host vehicle divided by a sum of the front downforce and a rear downforce of the host vehicle.

In other features, the parameter module is configured to determine first parameters of the host vehicle including the current understeering angle and second parameters of the host vehicle. The at least one module includes: a vehicle motion status-based bias command module configured, based on the first parameters, to generate the first bias lower bound and a third bias upper bound; and a wheel dynamics status-based command module configured, based on the second parameters, to generate a fourth bias upper bound. The first bias upper bound is generated based on the third bias upper bound and the fourth bias upper bound.

In other features, the downforce control system further includes a minimum module configured to determining a minimum between the third bias upper bound and the fourth bias upper bound and set the first bias upper bound to the minimum.

In other features, the parameter module is configured to determine an understeering angle gradient, a longitudinal velocity of the host vehicle, an effective torque of a propulsion system of the host vehicle, and a front road wheel angle. The vehicle motion status-based bias command module configured, based on the current understeering angle, the understeering angle gradient, the longitudinal velocity, the effective torque, and the front road wheel angle, to generate the first bias lower bound and the third bias upper bound.

In other features, the vehicle motion status-based bias command module is configured to generate the third bias upper bound and a raw bias lower bound based on an understeer angle bound table. The understeer angle bound table relates the current understeering angle, the understeering angle gradient, the longitudinal velocity, and the effective torque to the third bias upper bound and the raw bias lower bound.

In other features, the vehicle motion status-based bias command module is configured to adjust the third bias lower bound based on i) the raw bias lower bound, and ii) whether the raw bias lower bound decreases.

In other features, the parameter module is configured to determine speeds of wheels of the host vehicle and an amount of lateral acceleration. The wheel dynamics status-based command module is configured, based on the speeds of the wheels and the lateral acceleration, to generate the fourth bias upper bound.

In other features, the wheel dynamics status-based command module is configured to i) determine a wheel slip difference based on an average of front wheel speeds of the host vehicle and an average of rear heel speeds of the host vehicle, and ii) determine the fourth bias upper bound based on a wheel slip table, which relates the wheel slip difference and the lateral acceleration to the fourth bias upper bound.

In other features, the downforce tracking module is configured to implement model predictive control to adjust the one or more downforce devices based on the second bias lower bound and the second bias upper bound. The model predictive control is based on a matrix representation of a corresponding dynamic downforce system including the one or more downforce devices, where one or more values of a matrix of the matrix representation are based on the second bias lower bound and the second bias upper bound.

In other features, values of the matrix are based on the second bias lower bound and the second bias upper bound.

In other features, the values of the matrix are based on a front downforce normalization factor and a rear downforce normalization factor.

In other features, the matrix is $$\begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix},$$

where LB is the second bias lower bound, UB is the second bias upper bound, $F_{NF}$ is a front downforce normalization factor, and $R_{NF}$ is a rear downforce normalization factor.

In other features, a downforce control method for a host vehicle is disclosed. The method includes: generating a first bias lower bound and a first bias upper bound; determining a current understeering angle of the host vehicle; based on the current understeering angle, generating an understeer and oversteer multiplier; based on the first bias lower bound, the first bias upper bound, and the understeer and oversteer multiplier, generating a second bias lower bound and a second bias upper bound; and based on the second bias lower bound and the second bias upper bound, adjusting position of one or more downforce devices of the host vehicle.

In other features, the method further includes: determining first parameters of the host vehicle including the current understeering angle and a second parameters of the host vehicle; based on the first parameters, generating the first bias lower bound and a third bias upper bound; based on the second parameters, generating a fourth bias upper bound, where the first bias upper bound is generated based on the third bias upper bound and the fourth bias upper bound; and determining a minimum between the third bias upper bound and the fourth bias upper bound and set the first bias upper bound to the minimum.

In other features, the method further includes: determining first parameters of the host vehicle including the current understeering angle and second parameters of the host vehicle; based on the first parameters, generating the first bias lower bound and a third bias upper bound; based on the second parameters, generating a fourth bias upper bound, where the first bias upper bound is generated based on the third bias upper bound and the fourth bias upper bound; determining an understeering angle gradient, a longitudinal velocity of the host vehicle, an effective torque of a propulsion system of the host vehicle, and a front road wheel angle; and based on the current understeering angle, the understeering angle gradient, the longitudinal velocity, the effective torque, and the front road wheel angle, generating the first bias lower bound and the third bias upper bound.

In other features, the method further includes: generating the third bias upper bound and a raw bias lower bound based on an understeer angle bound table, where the understeer angle bound table relates the current understeering angle, the understeering angle gradient, the longitudinal velocity, and the effective torque to the third bias upper bound and the raw bias lower bound; and adjusting the third bias lower bound based on i) the raw bias lower bound, and ii) whether the raw bias lower bound decreases.

In other features, the method further includes: determining first parameters of the host vehicle including the current understeering angle and second parameters of the host vehicle; based on the first parameters, generating the first bias lower bound and a third bias upper bound; based on the second parameters, generating a fourth bias upper bound, where the first bias upper bound is generated based on the third bias upper bound and the fourth bias upper bound; determining speeds of wheels of the host vehicle and an amount of lateral acceleration; and based on the speeds of the wheels and the lateral acceleration, generating the fourth bias upper bound.

In other features, the method further includes determining a wheel slip difference based on an average of front wheel speeds of the host vehicle and an average of rear heel speeds of the host vehicle, and determining the fourth bias upper bound based on a wheel slip table, which relates the wheel slip difference and the lateral acceleration to the fourth bias upper bound.

In other features, the method further includes implementing model predictive control to adjust the one or more downforce devices based on the second bias lower bound and the second bias upper bound, where: the model predictive control is based on a matrix representation of a corresponding dynamic downforce system including the one or more downforce devices; one or more values of a matrix of the matrix representation are based on the second bias lower bound and the second bias upper bound; values of the matrix are based on i) the second bias lower bound and the second bias upper bound, and ii) a front downforce normalization factor and a rear downforce normalization factor; and the matrix is $$\begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix}.$$

LB is the second bias lower bound. UB is the second bias upper bound. $F_{NF}$ is a front downforce normalization factor, and $R_{NF}$ is a rear downforce normalization factor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
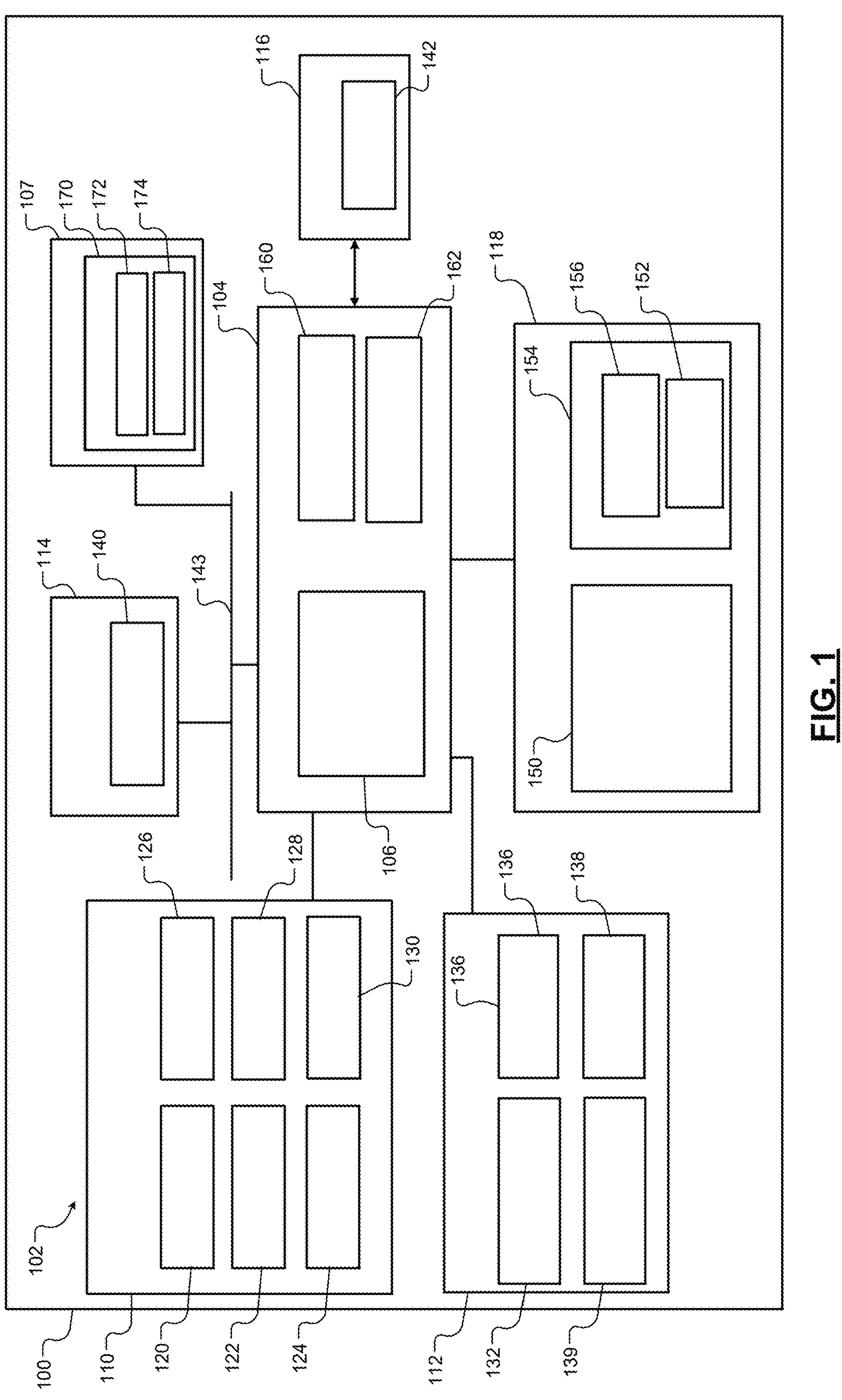
FIG. 1 is a functional block diagram of a vehicle including an example downforce control system having a downforce control module in accordance with the present disclosure.

A downforce control system controls downforce on a host vehicle by adjusting positions of aerodynamic devices such as a rear spoiler and/or a front gurney. The term "aerodynamic" is abbreviated herein as "aero". An algorithm can be used to determine required tire grip for enhanced vehicle motion control (VMC) performance during active downforce control. Positions of aero devices (or aero actuators) and thus downforce can be adjusted based on, for example, an understeer angle and positions of front and rear aero devices. The states of the aero devices may be set, for example, according to Table 1, where $F_{Z,req,Frnt}$ and $F_{Z,req,Rear}$ are front and rear downforce values.

TABLE 1

| | Front Aero Actuator | Rear Aero Actuator | |
|---|---|---|---|
| High Understeer | Not Fully Deployed | NA | Increase $F_{Z, req, Frnt}$ |
| | Fully Deployed | NA | Reduce $F_{Z, req, Rear}$ |
| High Oversteer | NA | Not Fully Deployed | Increase $F_{Z, req, Rear}$ |
| | NA | Fully Deployed | Reduce $F_{Z, req, Frnt}$ |

There are disadvantages associated with controlling downforce according to Table 1. For example, this type of downforce control is dependent on feedforward commands such as for understeering angle and aero front and rear downforce actuator positions. Feedback performance is setting positions of aero devices in solely dependent on the feedforward commands. The dependency on feedforward commands requires regular calibration activities, which can be time consuming. The stated control also can exhibit unbounded understeer or oversteer assistance. This can result in overshooting understeer and oversteer assistance thereby preventing a driver from gaining full control of the host vehicle.

Driver assistance in steering a host vehicle by adjusting position of aero devices during terminal oversteer and understeer situations can be inconsistent. The examples set forth herein provide more consistent and reliable driver assistance in such scenarios. The examples include a driver assistance strategy for terminal oversteer and understeer scenarios. Traditionally, the consistency of steering assistance through downforce control is heavily reliant on feedforward control. This can include maintaining uniform boundaries (minimum and maximum) downforce values. The examples set forth herein include setting and adjusting minimum and maximum downforce boundaries for downforce control and steering assistance to remove the dependency on feedforward control. The boundaries are used for aero bias ratio calculations. An aero bias ratio refers to an amount of front downforce divided by a total amount of downforce. The total amount of downforce being a sum of the front downforce and an amount of rear downforce.

Positions of downforce actuators are set based on the aero bias ratio. The adjustment in the boundaries enhances control precision and prevents excessive or too low an amount of assistance during understeer and oversteer situations. The stated boundaries also aid in making a corresponding calibration tuning process easier as the boundaries may not be changed or tuned at each control design change. The examples establish consistent aero bias upper and lower boundaries for aero bias calculations, which provides stability to the calibration tuning process by avoiding constant changes with each control design modification.

Implementing the boundaries (i.e., integrating the boundaries into downforce active control) presents challenges, as meeting an aero bias request through control modifications is not always straight forward and may not be feasible without proper arbitration. To address this, the boundaries are integrated as hard constraints into model predictive control (MPC) of downforce. This streamlines the process and ensures accurate achievement of a target aero bias ratio. Addressing the challenges of implementing boundaries into controls by integrating them as strict constraints in MPC ensures seamless fusion with control modifications.

The examples set forth herein include downforce control systems and methods that integrate standalone aero bias upper and lower boundaries into downforce control to reduce reliance on feedforward control. Instead of adding and adjusting feedforward requests, absolute boundaries are provided, which are independent of a feedforward control algorithm. This is accomplished while satisfying aero bias requests through control modifications. In an embodiment, the boundaries are implemented as hard constraints, which streamlines the downforce control process and ensures accurate achievement of a targeted aero bias ratio. Downforce assistance levels are optimized by implementing a learning gain process, which addresses the issue of excessive or insufficient assistance during maneuvers in changing situations. Introducing a learning gain process to dynamically adapt assistance levels, provides flexibility for changing scenarios and avoids potential issues of inconsistence assistance during maneuvers Also, by dynamically adjusting downforce assistance levels based on real-time feedback, a seamless and safe driving experience is achieved. The learning gain process is adaptive. For example, when a driver is oversteering or understeering, an adaptive level of steering assistance is provided through downforce control. This includes, depending on the situation, sometimes providing no change in assistance and other times increasing or decreasing amounts of downforce assistance provided.

FIG. 1 is a functional block diagram of a vehicle 100 including an example downforce control system 102 having a vehicle control module 104. The vehicle control module 104 includes a downforce control module 106. The downforce control module 106 adjusts positions of downforce actuators 107 based on various parameters referred to herein and based on set and actively adjusted aero bias upper and lower bounds (or aero bias minimum and maximum values). This is done to provide steering assistance and thus to aid in increasing, maintaining, and decreasing an amount of oversteer or understeer experienced. The boundaries and calculated aero bias ratios may be set and/or adjusted to enhance vehicle control and maintain the vehicle 100 in a balanced handling state. Operations performed by the downforce control module 106 are further described below and with respect to FIGS. 1-9.

The vehicle 100 further includes sensors 110, memory 112, an accelerator pedal actuator 114, a steering system 116, and a propulsion system 118. The sensors 110 may include wheel speed sensors 120, a vehicle speed sensor 122, a yaw rate sensor 124, an inertial measurement unit (IMU) 126, acceleration sensors (e.g., longitudinal and lateral acceleration sensos) 128, and other sensors 130 such as road wheel angle sensors, a steering wheel angle sensor, ride height sensors, etc. The memory 112 may store sensor data 132, applications 136, parameters 138, algorithms 139 (e.g., the algorithms referred to herein), etc. The sensor data 132 may include data collected from the sensors 110 and/or other sensors, such as an accelerator position sensor 140 of the accelerator pedal actuator 114, and a steering angle sensor 142 of the steering system 116. The accelerator pedal actuator 114 and accelerator position sensor 140 and/or other devices referred to herein may be connected to the vehicle control module 104 via a controller area network (CAN) or other network bus 143.

The vehicle control module 104 may control the propulsion system 118 based on the sensor data. The applications 136 may include the module 106 and/or other applications. The propulsion system 118 may include two or more torque sources, such as one or more motors and/or one or more engines (e.g., internal combustion engines). In the example shown in FIG. 1, the vehicle 100 includes an engine and one or more motors 152. The torque sources are independently controlled. The propulsion system includes a motor control system 154 that includes the one or more motors 152 and a motor control module 156 that may control operation of the one or more motors 152 based on signals from the vehicle control module 104.

The vehicle control module 104 may further include a mode selection module 160 and/or a parameter module 162. The modules 106, 108, 160 may select different operating modes, such as a redistribution mode, a torque limit control mode, a transition (or partial torque redistribution and partial torque limit control) mode, a normal torque shaping mode, front and rear axle torque increasing mode, a front and rear axle torque rate decreasing mode, a dynamic torque shaping mode, a preemptive torque distribution mode, a feedback wheel slip control mode, a neutral steering mode, an understeering mode, an oversteering mode, a counter steering mode, a drift mode, a drop throttle mode, a recovery mode, etc. The vehicle may operate in two or more of these modes at the same time. The torque redistribution mode refers to when torque is being selectively provided to front and rear axles of the vehicle 100. The torque limit control mode refers to when torque to front and/or rear axles is being limited. The stated modes of operation are further described below.

The downforce actuators 107 include aerodynamic bodies 170, which may include a rear spoiler 172 and a front gurney 174. The downforce control module 106 controls positions of the aerodynamic bodies 170 as described herein.

Figure 2:
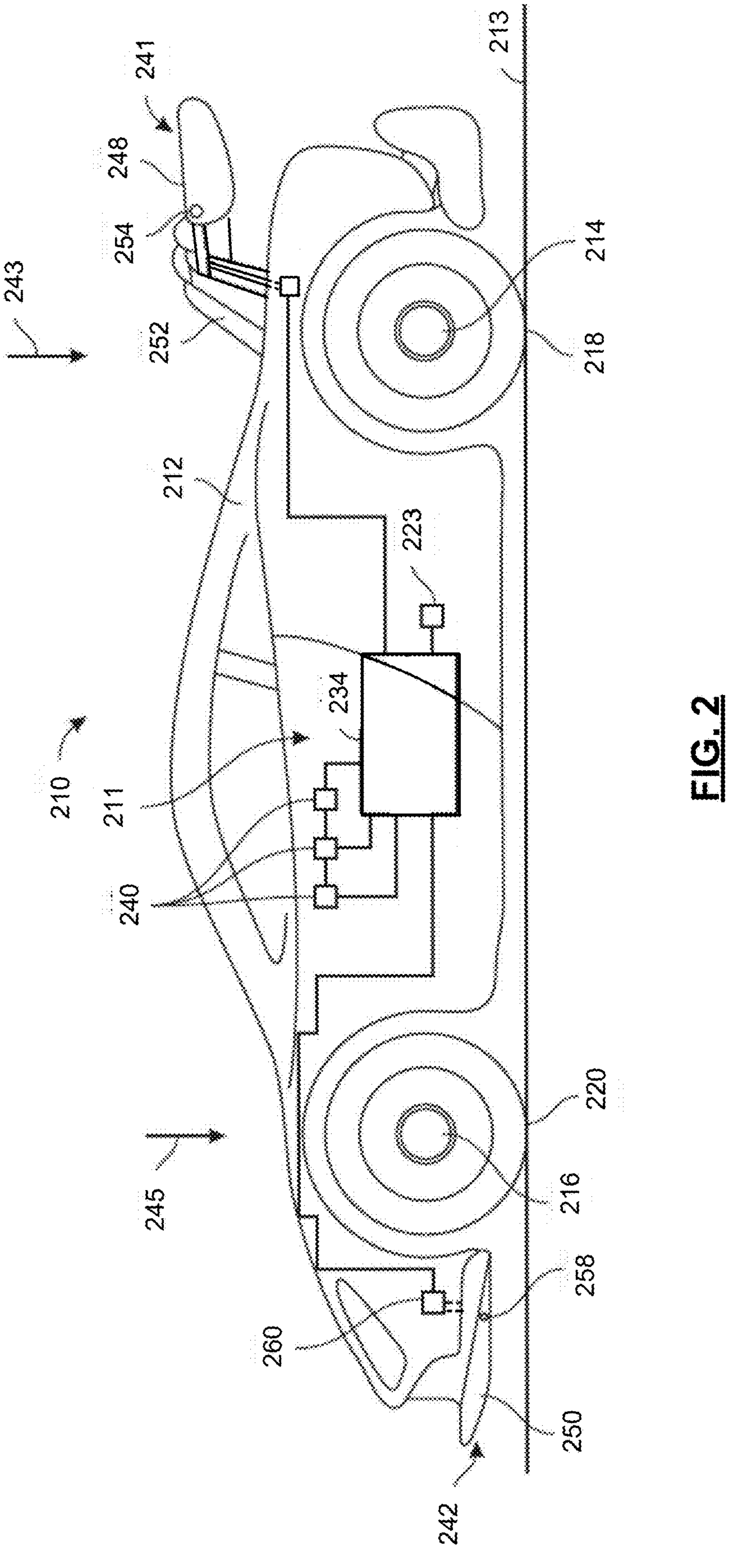
FIG. 2 is a functional block diagram of an example vehicle including independently controlled downforce actuators based on aerodynamic bias upper and lower bounds in accordance with the present disclosure.

FIG. 2 shows a vehicle 200 including independently controlled downforce actuators of a dynamic downforce system based on aerodynamic bias upper and lower bounds. The vehicle 200 may be configured similarly as the vehicle 100 of FIG. 1. The vehicle 200 includes a downforce control system 211. Although the vehicle 10 is shown as a coupe, the vehicle 10 may be another type of vehicle, such as a pickup truck, a sedan, a sport utility vehicle (SUVs), a recreational vehicle (RVs), etc. The downforce control system 211 determines how much extra tire grip is needed to be realized by a first aerodynamic actuator 241 and a second aerodynamic actuator 242 to keep the vehicle 210 stable during certain driving scenarios. Different stability criteria including axle, wheel and body stabilities are integrated together to calculate the amount of extra grip needed at each of a first axle 214 and a second axle 216 of the vehicle 210.

The downforce control system 211 provides active downforce control including feedforward control for fast response and feedback control for robustness to uncertainties and disturbance rejection. The downforce control system 211 may calculate a target normal force at the first axle 214 and the second axle 216 to keep the vehicle 210 stable with minimal drag. The downforce control system 211 may independently calculate a correct adjustment for a target normal force from feedforward control using tire-friction ellipse margin, axle stability, body stability and wheel stability. The final adjustment to the desired normal force is then determined and can be tuned depending on several factors. A physics-based open loop algorithm and a closed-loop algorithm (e.g., a feedback control algorithm) may be integrated and used to better estimate how much extra tire grip is needed at the first axle 214 and the second axle 216 of the vehicle 210.

The vehicle 210 includes a vehicle control module 234 (e.g., the vehicle control module 104 of FIG. 1) and one or more sensors 240 in communication with the vehicle control module 234. The sensors 240 may include global navigation satellite system (GNSS) transceivers or receivers, yaw rate sensors, ride height sensors, speed sensors, lidars, radars, ultrasonic sensors, and cameras, etc. The GNSS transceivers or receivers are configured to detect the location of the vehicle 210 in the globe. The speed sensors are configured to detect the speed (or velocity) of the vehicle 210. The yaw rate sensors are configured to determine the yaw rate of the vehicle 210. The cameras may have a field of view large enough to capture images in front, in the rear, and in the sides of the vehicle 210. The ride height sensors are configured to measure the ride height of the vehicle 210. The ultrasonic sensor may detect static and/or dynamic objects.

The vehicle 210 includes a vehicle body 212, the first (or rear) axle 214, and the second (or front) axle 216. The vehicle 210 further includes one or more first or rear tires 218 coupled to the first axle 214 and one or more second or front tires 220 coupled to the second axle 216.

The vehicle 210 includes a first or rear aerodynamic actuator 241 and a second or front aerodynamic actuator 242 each in communication with the vehicle control module 234. The vehicle control module 234 generates control signals for the actuators 241 and/or 242. The first aerodynamic actuator 241 includes the first aerodynamic body 248, and the second aerodynamic actuator 242 includes a second aerodynamic body 250. Each of the first aerodynamic body 248 and the second aerodynamic body 250 may be configured as a wing-shaped spoiler. The term "spoiler" means an aerodynamic device capable of disrupting air movement across the vehicle 210 while the vehicle 210 is in motion, thereby reducing drag and/or inducing an aerodynamic downforce on the vehicle 210. The term "downforce" means a force component that is perpendicular to the direction of relative motion of the vehicle 210, i.e., in the longitudinal direction, toward the road surface 213. For example, a spoiler can diffuse air by increasing the amount of turbulence flowing over the spoiler. The first aerodynamic actuator 241 is closer to the first axle 214 than to the second axle 216 to control a rear downforce 243 at or near the first axle 214. The second aerodynamic actuator 242 is closer to the second axle 216 than to the first axle 214 to control a front downforce 245 at or near the second axle 216. The rear downforce 243 and the front downforce 245 may be determined using sensor data from the sensors 240 (e.g., ride height sensors).

The first aerodynamic actuator 241 includes a support 252 directly coupled to the vehicle body 212 and one or more first pivots 254 (e.g., pivot pin, pivot mechanism, etc.) pivotally coupling the first aerodynamic body 248 to the vehicle body 12. Accordingly, the first aerodynamic body 248 is movable (e.g., pivotable) relative to the vehicle body 212. The first aerodynamic actuator 241 includes a first electric motor 256 (or another suitable machine) in communication with the vehicle control module 234 and coupled to the first aerodynamic body 248 through the first pivot 254. The vehicle control module 234 is therefore programmed to actuate the first electric motor 256 to move the first aerodynamic body 248 relative to the vehicle body 212.

The second aerodynamic actuator 242 is coupled to the vehicle body 212 and includes one or more second pivots 258 (e.g., pivot pin, pivot mechanism, etc.) pivotally coupling the second aerodynamic body 250 to the vehicle body 212. Accordingly, the second aerodynamic body 250 is movable (e.g., pivotable) relative to the vehicle body 212. The second aerodynamic actuator 242 includes a second electric motor 260 (or another suitable machine) in communication with the vehicle control module 234 and coupled to the second aerodynamic body 250 through the second pivot 258. The vehicle control module 234 is therefore programmed to actuate the second electric motor 260 to move the second aerodynamic body 250 relative to the vehicle body 212.

The vehicle 210 may include a user interface 223 in communication with the vehicle control module 234. The user interface 223 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification. The user interface 223 is in electronic communication with the vehicle control module 234 and is configured to receive inputs from the hearing-impaired vehicle occupant 225 (e.g., a vehicle user or a vehicle passenger). For example, the user interface 223 may include a touch screen and/or buttons configured to receive inputs from the vehicle occupant. Accordingly, the vehicle control module 234 is configured to receive inputs from the vehicle occupant via the user interface 223 and to provide an output (e.g., audible, haptic, and/or visible notifications) to the vehicle occupant.

Figure 3:
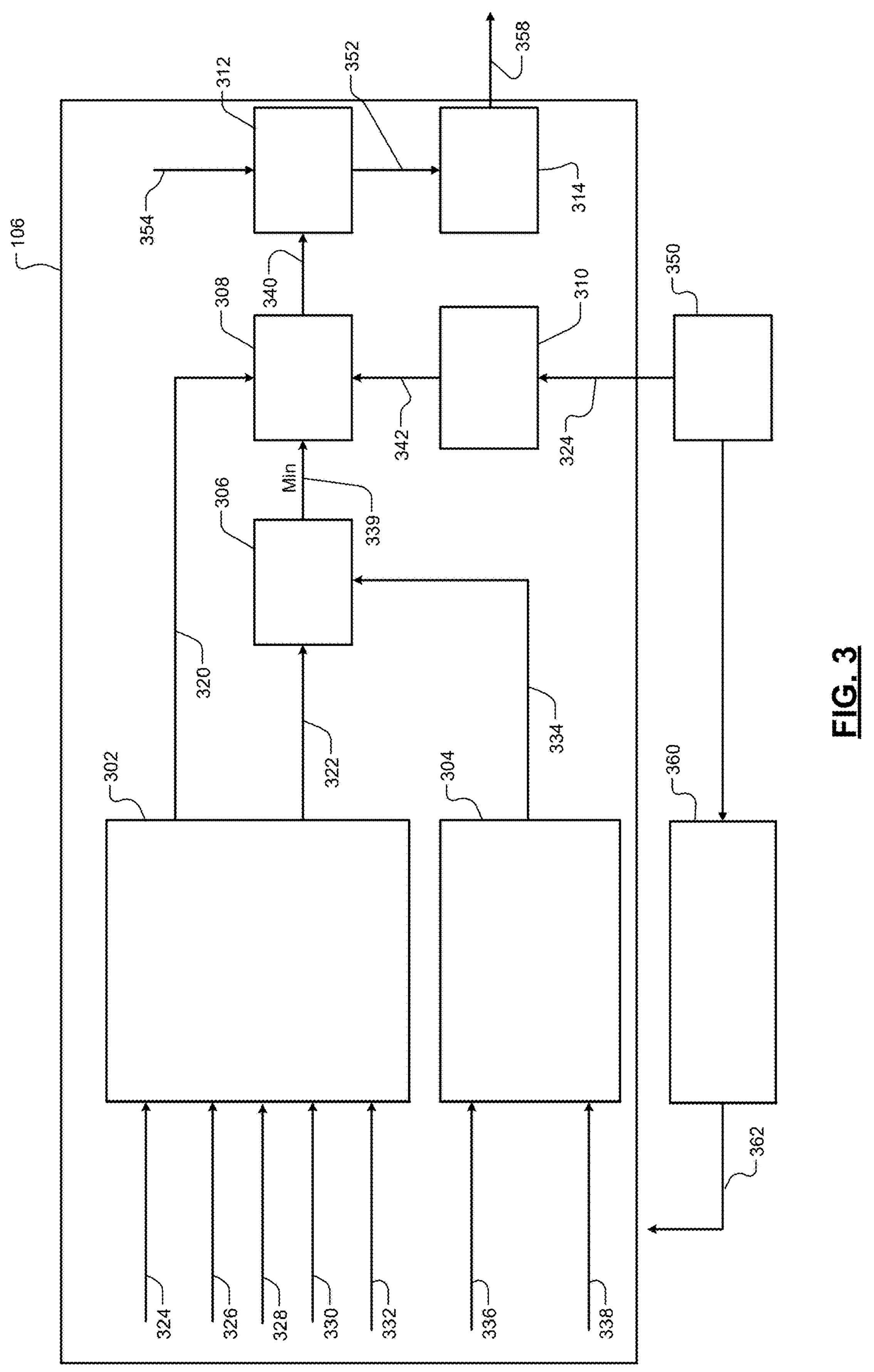
FIG. 3 is a functional block diagram of the downforce control module in accordance with the present disclosure.

FIG. 3 shows the downforce control module 106 that includes a vehicle motion status-based bias command module 302, a wheel dynamics status-based bias command module 304, a minimum module 306, a fusion module 308, an adaptive aerodynamic bias bounding module 310, a downforce tracking module 312, and a downforce actuator position module 314. The vehicle motion status-based bias command module 302 generates an aerodynamic bias lower bound 320 and an aerodynamic bias upper bound 322 based on an understeering angle 324 of the host vehicle, an understeering angle gradient 326, a longitudinal velocity 328 of the host vehicle, an effective torque 330 output by a propulsion system of the host vehicle, and a front road wheel angle 332. The wheel dynamics status-based bias command module 304 determines an aerodynamic bias upper bound 334 based on wheel speeds 336 and lateral acceleration requested 338.

The minimum module 306 determines a minimum 339 of the upper bounds 322, 334 and provides the minimum 339 to the fusion module 308. The fusion module 308 determines a final aero bias lower bound and a final aero bias upper bound, collectively designated 340, based on the aero bias lower bound 320, the minimum 339, and an understeer and oversteer multiplier 342. The adaptive aerodynamic bias bounding module 310 determines the understeer and oversteer multiplier 342 based on the understeering angle 324, which may be provided by sensors 350.

The downforce tracking module 312 generates an output signal including downforce values 352 for front and rear downforce actuators based on the final aero bias upper and lower bounds 340 and target front and rear downforce values 354 from feedforward control. The downforce actuator position module 314 sets and adjusts positions of the downforce actuators based on the downforce values 352. This includes generating one or more downforce actuator control signals 358, which may be provided to downforce actuators.

A parameter module 360 may be included and generate the parameters 324, 326, 328, 330, 332, 336 and/or 338 based on outputs of the sensors 350. The parameters are collectively represented by arrow 362. The sensors 350 may include any of the sensors disclosed herein. The parameter module 360 may be implemented as the parameter module 162 of FIG. 1.

Figure 4:
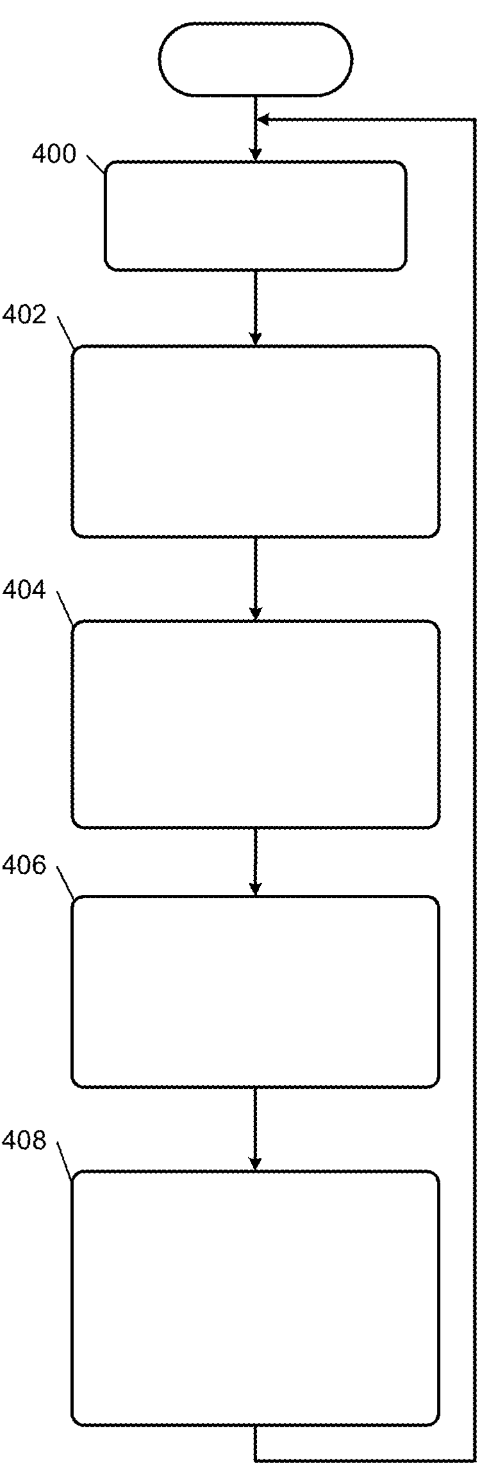
FIG. 4 illustrates an example overall downforce control method in accordance with the present disclosure.

FIG. 4 shows an overall downforce control method. The following operations may be iteratively performed. The following operations may be performed by the downforce control module 106 of FIGS. 1 and 3.

At 400, aero bias upper and lower boundaries are predefined. This may be performed by the bias command modules 302, 304 of FIG. 3. The aero bias upper and lower predefined boundaries (or thresholds) are established for an output signal. The output signal may refer to the output signal 352 output from the downforce tracking module 312. These boundaries represent the acceptable range within which the output should operate.

At 402, the bias command modules 302, 304 perform feedback control including monitoring vehicle status parameters and adjusting aero bias upper and lower predefined boundaries. The vehicle status parameters include the parameters 324, 326, 328, 330, 332, 336, and 338. Feedback control mechanisms are implemented to continuously monitor vehicle condition (or status) and adjust the bias upper and lower bounds based on the vehicle condition.

At 404, the adaptive aero bias bounding module 310 performs error correction including determining if the output signal exceeds the aero bias upper and lower predefined boundaries. If yes, corrective actions are taken to bring the output signal back within the target range associated with the aero bias upper and lower predefined boundaries.

At 406, the downforce tracking module 312 performed model predictive control (MPC) to continuously adjust control inputs until the output signal remains within the aero vias upper and lower predefined boundaries.

At 408, adaptation and optimization are performed including implementing boundary feedback control to fine-tune the aero bias upper and lower predefined boundaries. This may be implemented by the downforce tracking module 312 implementing one or more adaptive and optimization algorithms.

Figure 5:
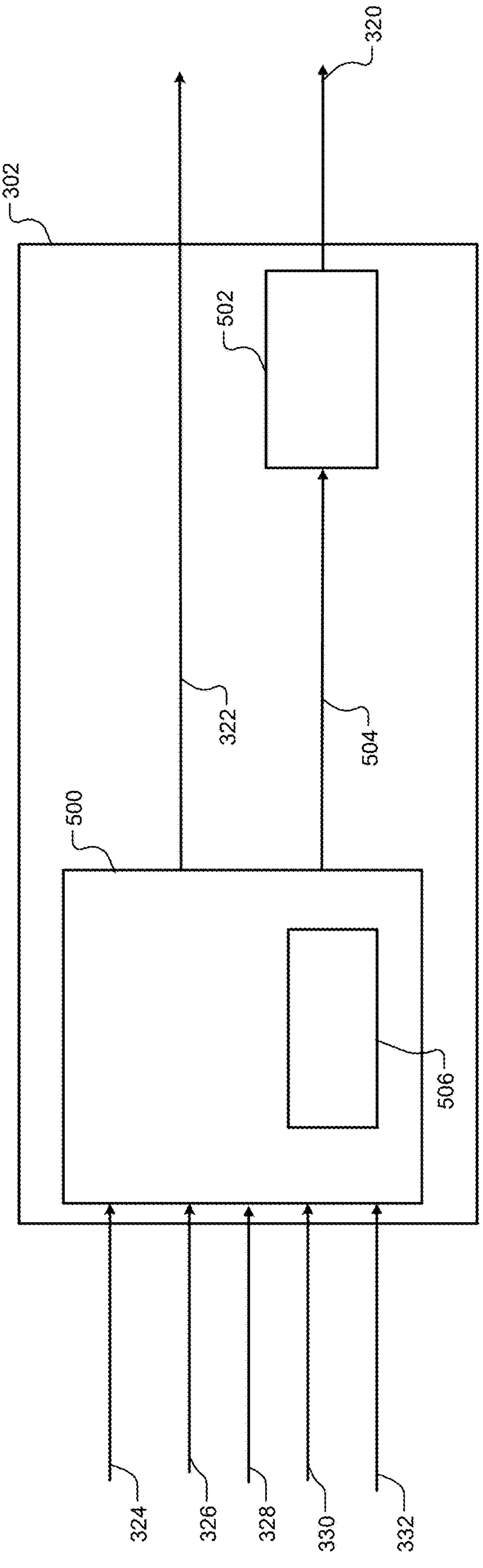
FIG. 5 is a functional block diagram of an example vehicle motion status-based bias command module in accordance with the present disclosure.

FIG. 5 shows the vehicle motion status-based bias command module 302 that includes an aero bias command module 500 and an aero bias lower bound adjustment module 502. The aero bias command module 500 generates the aero bias upper bound 322 and an aero bias raw lower bound 504 based on the parameters 324, 326, 328, 330, 332. The bounds 322, 504 may be determined using an understeer angle bound table 506, which relates the parameters 324, 326, 328, 330, 332 to the bounds 322, 504. A process of constructing and/or updating the understeer angle bound table 506 is described below with respect to FIG. 6.

The aero bias lower bound adjustment module 502 generates the aero bias lower bound 320 based on the aero bias raw lower bound 504. When the aero bias raw lower bound 504 decreases, the aero bias lower bound 320 is maintained at a current value when the driver of the host vehicle does not reduce the steering (i.e., the host vehicle is still experiencing understeering). Otherwise, the aero bias lower bound adjustment module 502 sets the aero bias lower bound 320 equal to the aero bias raw lower bound 504.

Figure 6:
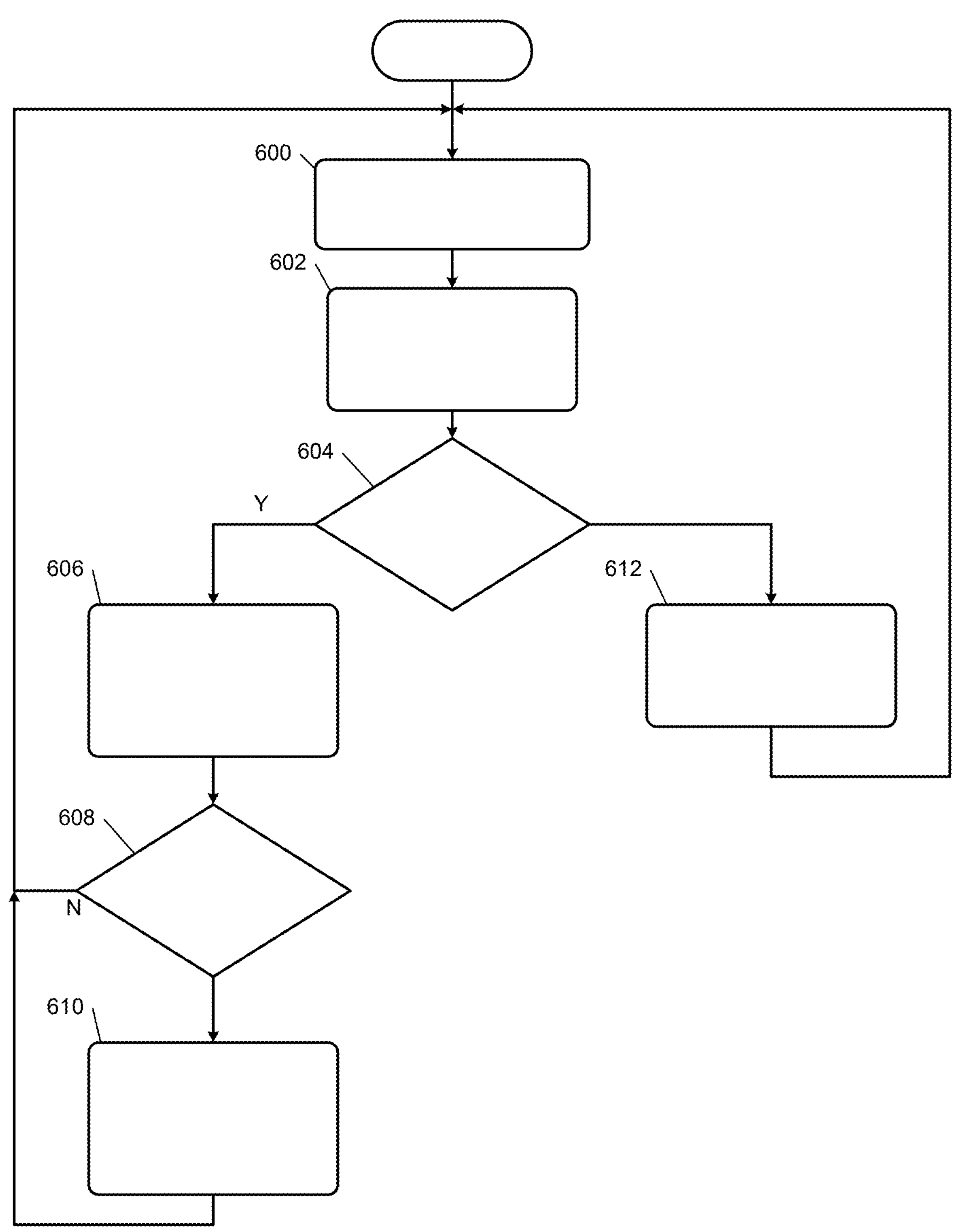
FIG. 6 illustrates an example method of updating an understeer angle bound table in accordance with the present disclosure.

FIG. 6 shows a method of updating an understeer angle bound table. The following operations may be iteratively performed. The following operations may be performed by an offboard testing system or by, for example, the vehicle control module 104 and/or the downforce control module 106 of FIG. 1.

At 600, the understeer angle bound table is provided, generated and/or updated. At 602, a driver in loop (DiL) software test with enabled reactive control can be performed. DiL is a way to simulate and test/calibrate the control system with a human driver in the loop. This may include setting up and performing a simulation or test for motion control for a host vehicle of a particular platform. As an example, the driver may provide a certain behavior and the system and/or corresponding control module may determine understeering and/or oversteering values. In an embodiment, an alternative method, other than DiL, is used, which includes vehicle testing.

At 604, it is determined whether there is high oversteer or high understeer. If yes, operation 606 may be performed, otherwise operation 612 may be performed.

At 606, arbitration of final aero bias upper and lower boundaries is performed. This may be based on estimates of current downforce on the host vehicle and targets values for the current downforce. The larger the differences between the estimates and the target values, the more the final aero bias upper and lower boundaries are adjusted.

At 608, it is determined whether enough driver steering assistance has been provided with the provided amounts of downforce. If enough assistance has been provided operation 610 is performed, otherwise operation 600 may be performed.

At 610, a same amount of steering assistance (or provided downforce) is maintained and/or a same amount of change in steering assistance (or provided downforce) is maintained. For example, if the last change in assistance was 20% and the downforce estimates are approaching and/or within a predetermined range of the target downforce values, then the system continues to make the same amount of change. At 612, no change in reactive control is made. No change to the aero bias ratio is made.

Figure 7:
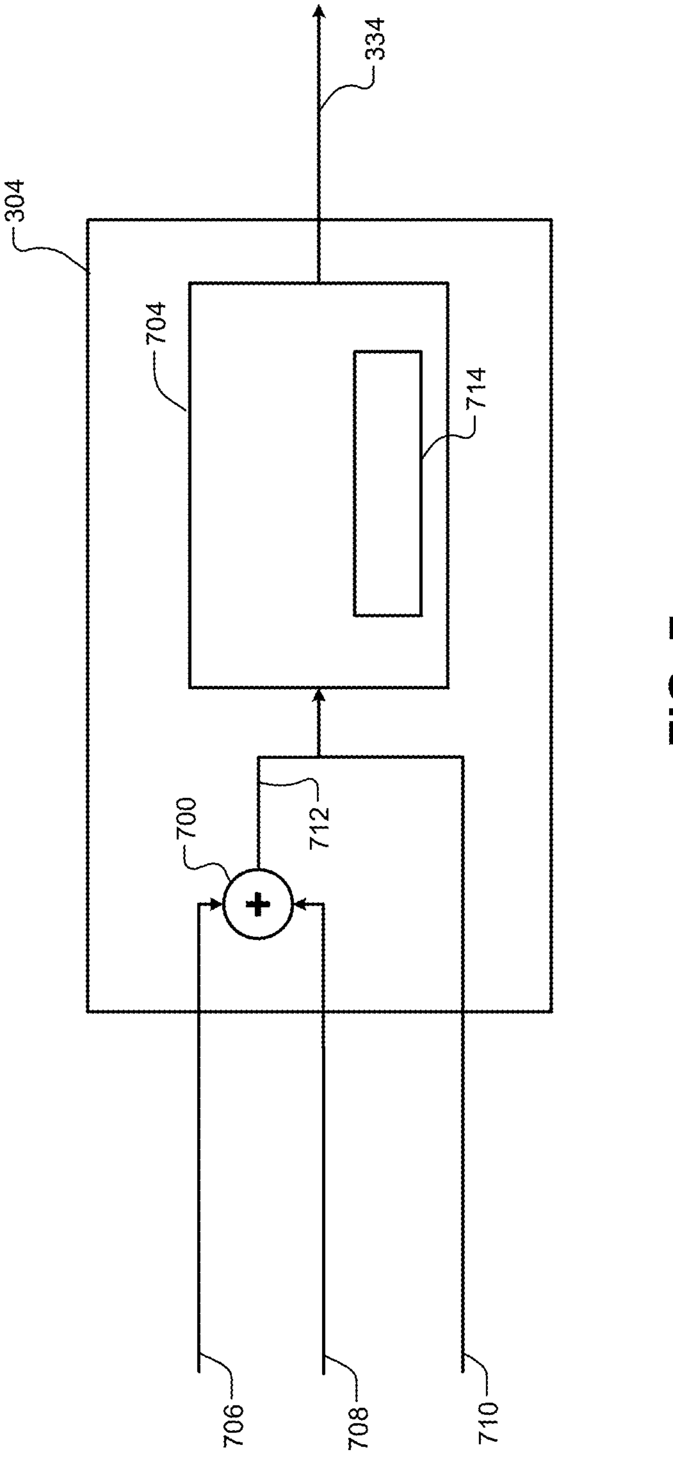
FIG. 7 is a functional block diagram of an example wheel dynamics status-based bias command module in accordance with the present disclosure.

FIG. 7 shows the wheel dynamics status-based bias command module 304, which includes a summer 700 and a wheel slip module 704. The summer 700 includes a front average wheel speed 706, a rear average wheel speed 708 and a lateral acceleration requested 710. The summer 700 determines a difference 712 in wheel slip between the front average wheel speed 706 and the rear average wheel speed 708. The wheel slip module 704 determines the aero bias upper bound 334 based on the wheel slip difference 712 and the lateral acceleration requested 710. This may be accomplished using a wheel slip table 714 that relates the wheel slip difference 712 and the lateral acceleration requested 710 to the aero bias upper bound 334.

Figure 8:
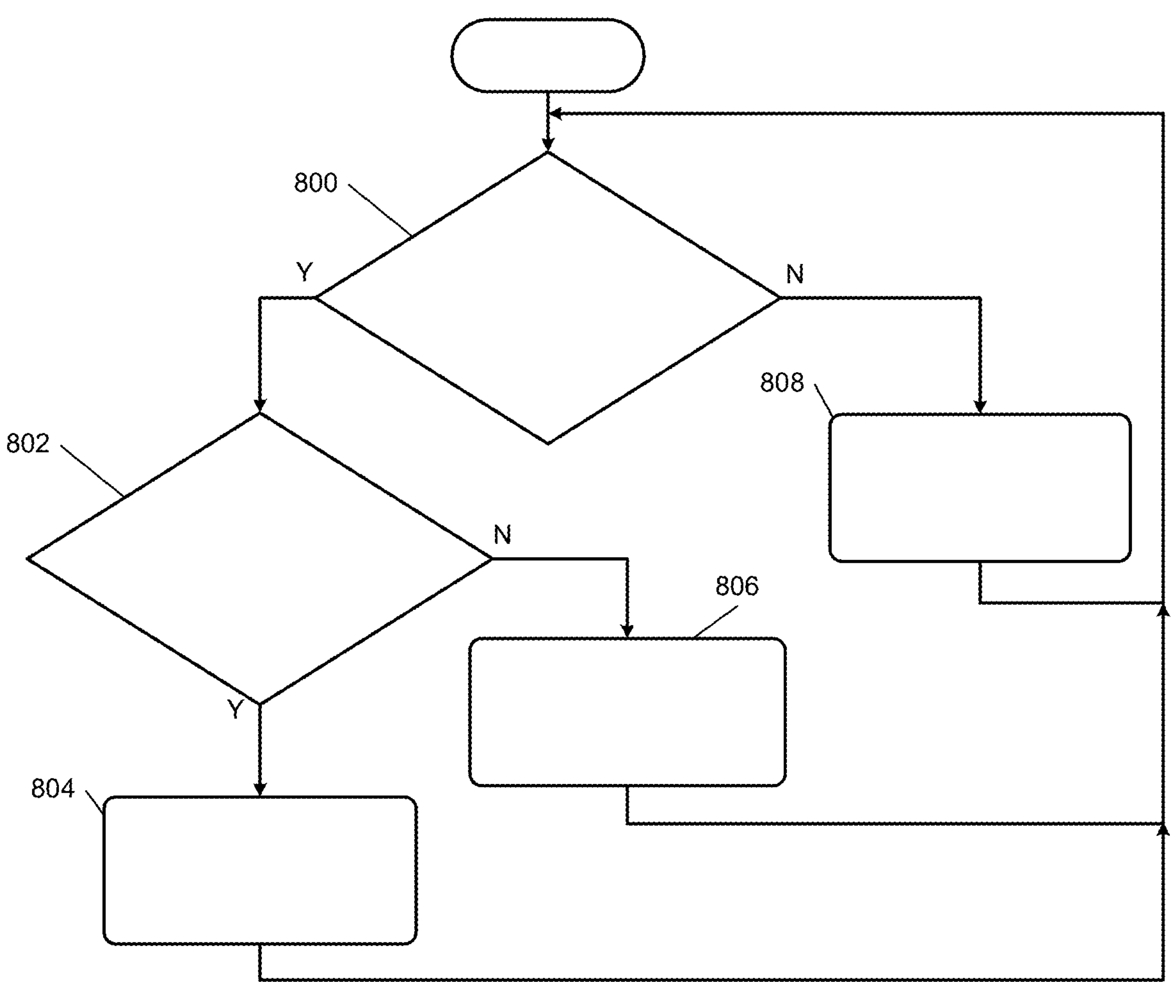
FIG. 8. Illustrates an example adaptive aerodynamic bias bounding algorithm in accordance with the present disclosure.

FIG. 8. shows an adaptive aerodynamic bias bounding algorithm. The following operations may be iteratively performed. The following operations may be performed by the adaptive aerodynamic bias bounding module 310 of FIG. 3.

At 800, it is determined whether an understeer level or an oversteer level at the current operating point is greater than a target maximum understeer level or a target maximum oversteer level. If yes operation 802 is performed.

At 802, it is determined whether the understeer level or the oversteer level at the current operating point is less than the understeer level or the oversteer level for a previous event. If yes, operation 804 is performed, otherwise operation 806 is performed.

At 804, the understeer and oversteer multiplier is increased for the current operating point. At 806, the understeer and oversteer multiplier is decreased for the current operating point. At 808, the understeer and oversteer multiplier is maintained at a current value.

Aero bias upper and lower bound tables may be calibrated offline and adjusted during vehicle operation due to component wear and environmental uncertainties. An adaptive algorithm is implemented to update these tables. The adaptive algorithm monitors vehicle understeering and oversteering and adjusts these tables accordingly.

If with current aero bias upper-bound values in the corresponding table, the host vehicle continues to experience excessive oversteering, the adaptive algorithm slightly reduces the aero bias upper bound values corresponding to that situation (e.g., certain values for velocity, lateral acceleration Ay, wheel angle, etc.) in the table for the operating condition(s) (e.g., a corner exit). This adjustment is repeated for future oversteering situations until the vehicle oversteering is within an acceptable range.

If with current aero bias lower-bound values in the corresponding table, the host vehicle continues to experience excessive understeering, the proposed adaptive algorithm slightly increases the aero bias lower bound values corresponding to that situation (e.g., certain values for velocity, lateral acceleration Ay, wheel angle, etc.) in the table for the operating conditions (e.g., a corner entry). This adjustment is repeated for future understeering situations until the vehicle understeering is within an acceptable range.

Figure 9:
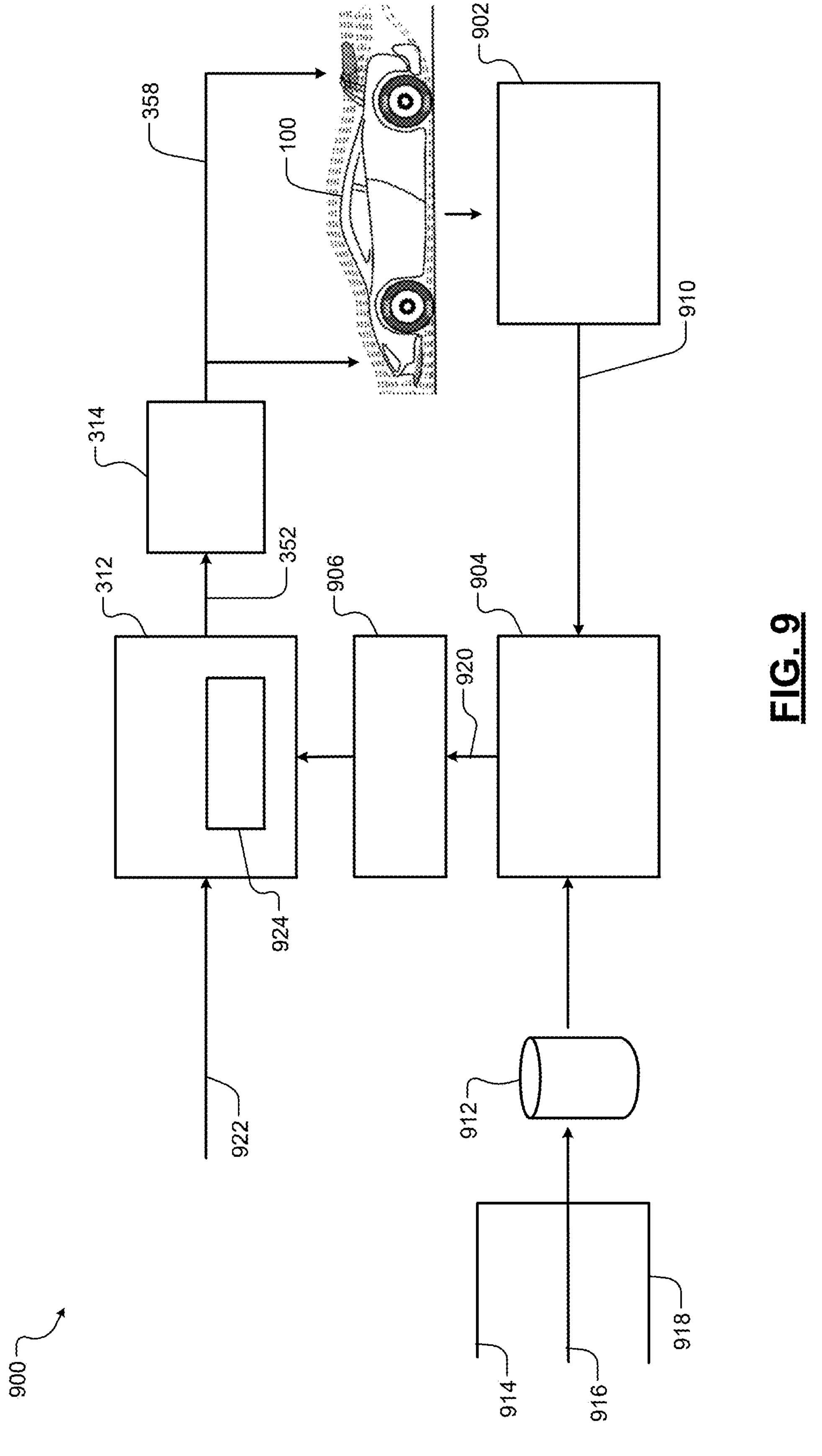
FIG. 9 is a functional block diagram of an example downforce control system in accordance with the present disclosure.

FIG. 9 shows a downforce control system 900, which includes the downforce tracking module 312, a measurement and estimation module 902, one or more neural networks 904, and a state space model 906. The measurement and estimation module 902 is configured to measure and estimate parameters 910 such as velocity of the host vehicle 100, acceleration of the host vehicle 100, ride heights of the host vehicle 100, front and rear downforces experienced by the host vehicle 100, and positions of the downforce actuators of the host vehicle 100. The parameters 910 are provided for online training of the one or more neural networks 904. The measurement and estimation module 902 may be implemented as the parameter module 162 of FIG. 1 and/or the parameter module 360 of FIG. 3. Offline training of the neural networks 904 is also performed. This includes providing a dataset 912 including model-in-the-loop data 914, DiL data 916 and vehicle data 918 to the neural networks 904.

The neural networks 904 generate weights (e.g., weights $W_{11}$, $W_{12}$, $W_{21}$) and bias values (e.g., bias values $B_1$, $B_2$, $B_3$), designated 920, for the state space model 906. The state space model 906 generates input matrices A, B, C, D, which may be used by the downforce tracking module 312 to generate the output signal 352. The downforce tracking module generates the output signal 352 based on target front and rear downforce values $F_{dfdes}$ and $F_{drdes}$, designated 922, and the matrices A, B, C, D, where B is an input matrix and C is an output matrix. The A and B matrices are generated from neural network linearization for aero maps. The downforce actuator position module 314 generates the downforce actuator control signals 358 based on the output signal 352.

The state space model 906 (or state-space representation of the corresponding dynamic downforce system) may be represented by equations 1 and 2, where $\dot{x}$ is longitudinal velocity, ẏ lateral velocity, x is longitudinal speed, and u is commanded downforce.

$$\dot{x} = Ax + Bu \tag{1}$$

$$\dot{y} = Cx + Du \tag{2}$$

In order to respect aero bias upper and lower boundaries, these boundaries are integrated into the MPC. The output signal 352 may be represented by equations 3-5, where $X_k$ is a state vector, $F_{df,frnt}$, $F_{df,rear}$ are the actual estimated front downforce and rear downforce values, σ is an activation function, $V_x$ is longitudinal velocity, $RH_f$ and $RH_r$ are front and rear ride heights, $cmd_{frnt}$ and $cmd_{rear}$ are commanded downforce values, Dm is one of multiple actuator model feedthrough matrices, where m is an integer greater than one, $Y_k$ is an output vector and/or the output signal 352. Equation 3 is a nonlinear state-space representation of a neural network model. To use this model for model-based control, linearization is needed, which provides equation 4. Examples of the C matrix are shown in equations 6 and 7. In equation 6, the C matrix is $$\begin{bmatrix} 1 & 0 \\ 0 & 1 \end{bmatrix}.$$

In equation 7, the C matrix is $$\begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix},$$

where LB is an aero bias lower bound, UB is an aero bias upper bound, $F_{NF}$ is a front normalization factor, and $R_{NF}$ is a rear normalization factor.

$$X_k = \begin{bmatrix} F_{df,frnt} \\ F_{df,rear} \end{bmatrix} = W_{31}\sigma\left(W_{21}\tanh\left(W_{11}\begin{bmatrix} V_x \\ RH_{frnt} \\ RH_{rear} \end{bmatrix} + W_{12}\begin{bmatrix} Cmd_{frnt} \\ Cmd_{rear} \end{bmatrix} + B_1\right) + B_2\right) + B_3 \tag{3}$$

$$X_k = BU_k + D_m \tag{4}$$

$$Y_k = CX_k \tag{5}$$

$$Y_k = \begin{bmatrix} 1 & 0 \\ 0 & 1 \end{bmatrix} X_k \tag{6}$$

$$Y_k = \begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix} X_k \tag{7}$$

In order to respect aero bias boundaries, two outputs are included in the output vector $Y_k$ and are constrained during the optimization by the MPC solver 924 of the downforce tracking module 312. The downforce tracking module 312 constrains the aero bias ratio based on the boundaries UB and LB according to equation 8, where $F_{df,f}$ and $F_{df,r}$ are front and rear downforce values.

$$LB \leq \text{Areo Bias ratio} = \frac{F_{df,f}}{F_{df,f} + F_{df,r}} \leq UB \tag{8}$$

Due to non-linearity of the aero bias ratio with respect to the front and rear downforce (state space states) values $F_{df,f}$ and $F_{df,r}$, the correlation of equation 8 cannot be implemented in the MPC in this format. Therefore, the following equations 9-10 having virtual outputs for LB and UB are used to facilitate the implementation of the above inequality of equation 8 in the MPC.

$$\text{Virtual Output for } LB = y_{k,3} = (LB-1)F_{df,f} + LBF_{df,r} \tag{9}$$

$$\text{Virtual Output for } UB = y_{k,4} = (UB-1)F_{df,f} + ULBF_{df,r} \tag{10}$$

Equations 9-10 are both linear state functions, therefore the C matrix can be represented as provided in equation 7. In order to satisfy the inequality constraint of equation 8, $Y_{k,3}$ is maintained as a negative value and $Y_{k,4}$ is maintained as a positive value. The C matrix is used to adjust aero bias upper and lower boundaries and then downforce actuator positions are adjusted based on the aero bias upper and lower boundaries.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A downforce control system of a host vehicle, the downforce control system comprising:

at least one module configured to generate a first bias lower bound and a first bias upper bound;

a parameter module configured to determine a current understeering angle of the host vehicle;

an adaptive bias bounding module configured to generate an understeer and oversteer multiplier based on the current understeering angle;

a fusion module configured, based on the first bias lower bound, the first bias upper bound, and the understeer and oversteer multiplier, to generate a second bias lower bound and a second bias upper bound; and a downforce tracking module configured, based on the second bias lower bound and the second bias upper bound, to adjust position of one or more downforce devices of the host vehicle.

2. The downforce control system of claim 1, wherein:

the second bias lower bound is less than or equal to an aerodynamic bias value, which is less than or equal to the second bias upper bound; and the aerodynamic bias value is equal to a front downforce of the host vehicle divided by a sum of the front downforce and a rear downforce of the host vehicle.

3. The downforce control system of claim 1, wherein:

the parameter module is configured to determine a first plurality of parameters of the host vehicle including the current understeering angle and a second plurality of parameters of the host vehicle;

the at least one module comprises:

a vehicle motion status-based bias command module configured, based on the first plurality of parameters, to generate the first bias lower bound and a third bias upper bound; and a wheel dynamics status-based command module configured, based on the second plurality of parameters, to generate a fourth bias upper bound; and the first bias upper bound is generated based on the third bias upper bound and the fourth bias upper bound.

4. The downforce control system of claim 3, further comprising a minimum module configured to determining a minimum between the third bias upper bound and the fourth bias upper bound and set the first bias upper bound to the minimum.

5. The downforce control system of claim 3, wherein:

the parameter module is configured to determine an understeering angle gradient, a longitudinal velocity of the host vehicle, an effective torque of a propulsion system of the host vehicle, and a front road wheel angle; and the vehicle motion status-based bias command module configured, based on the current understeering angle, the understeering angle gradient, the longitudinal velocity, the effective torque, and the front road wheel angle, to generate the first bias lower bound and the third bias upper bound.

6. The downforce control system of claim 5, wherein:

the vehicle motion status-based bias command module is configured to generate the third bias upper bound and a raw bias lower bound based on an understeer angle bound table; and the understeer angle bound table relates the current understeering angle, the understeering angle gradient, the longitudinal velocity, and the effective torque to the third bias upper bound and the raw bias lower bound.

7. The downforce control system of claim 6, wherein the vehicle motion status-based bias command module is configured to adjust the third bias lower bound based on i) the raw bias lower bound, and ii) whether the raw bias lower bound decreases.

8. The downforce control system of claim 3, wherein:

the parameter module is configured to determine speeds of wheels of the host vehicle and an amount of lateral acceleration; and the wheel dynamics status-based command module is configured, based on the speeds of the wheels and the lateral acceleration, to generate the fourth bias upper bound.

9. The downforce control system of claim 8, wherein the wheel dynamics status-based command module is configured to i) determine a wheel slip difference based on an average of front wheel speeds of the host vehicle and an average of rear heel speeds of the host vehicle, and ii) determine the fourth bias upper bound based on a wheel slip table, which relates the wheel slip difference and the lateral acceleration to the fourth bias upper bound.

10. The downforce control system of claim 1, wherein:

the downforce tracking module is configured to implement model predictive control to adjust the one or more downforce devices based on the second bias lower bound and the second bias upper bound; and the model predictive control is based on a matrix representation of the downforce control system, where one or more values of a matrix of the matrix representation are based on the second bias lower bound and the second bias upper bound.

11. The downforce control system of claim 10, wherein a plurality of values of the matrix are based on the second bias lower bound and the second bias upper bound.

12. The downforce control system of claim 11, wherein the plurality of values of the matrix are based on a front downforce normalization factor and a rear downforce normalization factor.

13. The downforce control system of claim 10, wherein the matrix is $$\begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix},$$

where LB is the second bias lower bound, UB is the second bias upper bound, $F_{NF}$ is a front downforce normalization factor, and $R_{NF}$ is a rear downforce normalization factor.

14. A downforce control method for a host vehicle, the method comprising:

generating a first bias lower bound and a first bias upper bound;

determining a current understeering angle of the host vehicle;

based on the current understeering angle, generating an understeer and oversteer multiplier;

based on the first bias lower bound, the first bias upper bound, and the understeer and oversteer multiplier, generating a second bias lower bound and a second bias upper bound; and based on the second bias lower bound and the second bias upper bound, adjusting position of one or more downforce devices of the host vehicle.

15. The method of claim 14, further comprising:

determining a first plurality of parameters of the host vehicle including the current understeering angle and a second plurality of parameters of the host vehicle;

based on the first plurality of parameters, generating the first bias lower bound and a third bias upper bound;

based on the second plurality of parameters, generating a fourth bias upper bound, wherein the first bias upper bound is generated based on the third bias upper bound and the fourth bias upper bound; and determining a minimum between the third bias upper bound and the fourth bias upper bound and set the first bias upper bound to the minimum.

16. The method of claim 14, further comprising:

determining a first plurality of parameters of the host vehicle including the current understeering angle and a second plurality of parameters of the host vehicle;

based on the first plurality of parameters, generating the first bias lower bound and a third bias upper bound;

based on the second plurality of parameters, generating a fourth bias upper bound, wherein the first bias upper bound is generated based on the third bias upper bound and the fourth bias upper bound;

determining an understeering angle gradient, a longitudinal velocity of the host vehicle, an effective torque of a propulsion system of the host vehicle, and a front road wheel angle; and based on the current understeering angle, the understeering angle gradient, the longitudinal velocity, the effective torque, and the front road wheel angle, generating the first bias lower bound and the third bias upper bound.

17. The method of claim 16, further comprising:

generating the third bias upper bound and a raw bias lower bound based on an understeer angle bound table, wherein the understeer angle bound table relates the current understeering angle, the understeering angle gradient, the longitudinal velocity, and the effective torque to the third bias upper bound and the raw bias lower bound; and adjusting the third bias lower bound based on i) the raw bias lower bound, and ii) whether the raw bias lower bound decreases.

18. The method of claim 14, further comprising:

determining a first plurality of parameters of the host vehicle including the current understeering angle and a second plurality of parameters of the host vehicle;

based on the first plurality of parameters, generating the first bias lower bound and a third bias upper bound;

based on the second plurality of parameters, generating a fourth bias upper bound, wherein the first bias upper bound is generated based on the third bias upper bound and the fourth bias upper bound;

determining speeds of wheels of the host vehicle and an amount of lateral acceleration; and based on the speeds of the wheels and the lateral acceleration, generating the fourth bias upper bound.

19. The method of claim 18, further comprising determining a wheel slip difference based on an average of front wheel speeds of the host vehicle and an average of rear heel speeds of the host vehicle, and determining the fourth bias upper bound based on a wheel slip table, which relates the wheel slip difference and the lateral acceleration to the fourth bias upper bound.

20. The method of claim 14, further comprising implementing model predictive control to adjust the one or more downforce devices based on the second bias lower bound and the second bias upper bound, wherein: the model predictive control is based on a matrix representation of a corresponding dynamic downforce system including the one or more downforce devices; one or more values of a matrix of the matrix representation are based on the second bias lower bound and the second bias upper bound; a plurality of values of the matrix are based on i) the second bias lower bound and the second bias upper bound, and ii) a front downforce normalization factor and a rear downforce normalization factor; and the matrix is $$\begin{bmatrix} 1 & 0 \\ 0 & 1 \\ \frac{LB-1}{F_{NF}} & \frac{LB}{R_{NF}} \\ \frac{UB-1}{F_{NF}} & \frac{UB}{R_{NF}} \end{bmatrix},$$

where LB is the second bias lower bound, UB is the second bias upper bound, FNF is the front downforce normalization factor, and RNF is the rear downforce normalization factor.

* * * * *